(12) United States Patent
Bendiabdallah et al.

(10) Patent No.: US 11,963,002 B2
(45) Date of Patent: Apr. 16, 2024

(54) NETWORK KEY RECOVERY, NETWORK KEY TRANSMISSION, NETWORK KEY RECOVERY MANAGEMENT, TERMINAL, MEDIATION SERVER AND POINT OF ACCESS IMPLEMENTING THEM

(71) Applicant: ORANGE, Issy les Moulineaux (FR)

(72) Inventors: Halim Bendiabdallah, Chatillon (FR); Elyass Najmi, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 103 days.

(21) Appl. No.: 17/430,918

(22) PCT Filed: Feb. 13, 2020

(86) PCT No.: PCT/FR2020/050260
§ 371 (c)(1),
(2) Date: Aug. 13, 2021

(87) PCT Pub. No.: WO2020/165540
PCT Pub. Date: Aug. 20, 2020

(65) Prior Publication Data
US 2022/0132308 A1 Apr. 28, 2022

(30) Foreign Application Priority Data
Feb. 15, 2019 (FR) ...................................... 1901553

(51) Int. Cl.
*H04L 29/06* (2006.01)
*H04W 12/03* (2021.01)
(Continued)

(52) U.S. Cl.
CPC ....... *H04W 12/0433* (2021.01); *H04W 12/03* (2021.01); *H04W 12/0431* (2021.01); *H04W 12/06* (2013.01)

(58) Field of Classification Search
CPC ............. H04W 12/0433; H04W 12/03; H04W 12/0431; H04W 12/06; H04W 12/069; H04W 12/50; H04L 63/061
See application file for complete search history.

(56) References Cited

U.S. PATENT DOCUMENTS

| | | | |
|---|---|---|---|
| 2011/0047603 A1* | 2/2011 | Gordon | H04L 63/0823 726/5 |
| 2011/0055574 A1* | 3/2011 | Fascenda | H04L 63/061 713/172 |

(Continued)

FOREIGN PATENT DOCUMENTS

| | | | | |
|---|---|---|---|---|
| EP | 3276885 A1 * | 1/2018 | ......... | H04L 12/2807 |
| EP | 3276885 A1 | 1/2018 | | |

OTHER PUBLICATIONS

International Search Report dated May 4, 2020 for corresponding International Application No. PCT/FR2020/050260, dated Feb. 13, 2020.

(Continued)

*Primary Examiner* — Kendall Dolly
(74) *Attorney, Agent, or Firm* — David D. Brush; Westman, Champlin & Koehler, P.A.

(57) ABSTRACT

A method for recovering a network key, a method for transmitting a network key, and a method for managing recovery of a network key. The method for recovering a network key from a point of access to a network is implemented by a terminal, with the network key allowing the terminal to be associated with the point of access during the first connection of the terminal to the point of access. The recovery method includes receiving, by a terminal, a network key transmitted via a mediation server by a point of access, the terminal having been identified by the mediation server by using an association, prior to the first connection, of an identifier of the terminal and an identifier of the point of access. Thus, the key cannot be easily recovered by a third party and limits intrusions into the private network managed by the point of access.

14 Claims, 7 Drawing Sheets

(51) Int. Cl.
*H04W 12/0431* (2021.01)
*H04W 12/0433* (2021.01)
*H04W 12/06* (2021.01)

(56) References Cited

U.S. PATENT DOCUMENTS

| | | | |
|---|---|---|---|
| 2014/0247941 A1* | 9/2014 | Gu | H04W 12/50 |
| | | | 380/270 |
| 2015/0229475 A1* | 8/2015 | Benoit | H04L 63/20 |
| | | | 713/168 |
| 2017/0048700 A1* | 2/2017 | Huang | H04W 12/0431 |
| 2018/0109381 A1* | 4/2018 | Cammarota | H04W 12/041 |
| 2018/0248694 A1* | 8/2018 | Benoit | H04L 63/0823 |

OTHER PUBLICATIONS

Written Opinion of the International Searching Authority dated May 4, 2020 for corresponding International Application No. PCT/FR2020/050260, filed Feb. 13, 2020.

English translation of the Written Opinion of the International Searching Authority dated May 12, 2020 for corresponding International Application No. PCT/FR2020/050260, filed Feb. 13, 2020.

\* cited by examiner

NETWORK KEY RECOVERY, NETWORK KEY TRANSMISSION, NETWORK KEY RECOVERY MANAGEMENT, TERMINAL, MEDIATION SERVER AND POINT OF ACCESS IMPLEMENTING THEM

TECHNICAL FIELD

The invention relates to a network key recovery method, to a network key sending method, to a network key recovery management method, to a terminal, to a mediation server and to an access point. The network key is in particular a key for associating a terminal with an access point via a wireless network such as a Wi-Fi network (registered trademark).

PRIOR ART

To connect a terminal (computer, smartphone, printer, camera, etc.) through a wireless network (in particular Wi-Fi) to an access point device to a communication network (in particular an Internet router or a gateway between a private network and a public network, such as the Internet), access points are provided with a network key, also called WEP (Wired Equivalent Privacy, that is to say securing of wireless access), WPA (Wi-Fi Protected Access) or WPA2 key (registered trademarks) depending on the standard that is used.

The network key may simply be written on the access point device, also colloquially called access point (for example on a label affixed directly to the access point and/or a label affixed to the packaging of the access point). The user wishing to connect a tablet to this access point via the Wi-Fi network will input the Wi-Fi key read from the access point on his tablet upon a request to connect to this access point.

This first connection is therefore cumbersome because the network keys are often lengthy in order to avoid risks of intrusion into the private network. Furthermore, the security of the network depends on the location at which the access point is placed, because if it is accessible to a large number of people, said security will thereby be reduced since the network key is easily able to be read.

This network key may be modified by users by way of an interface of the access point accessible via the Internet (either directly on an Internet page or via an application dedicated to the access point, such as the Ma Livebox application—registered trademark). The risk is then that of the user forgetting the modified network key, preventing any new association of a terminal with the access point, that is to say the addition of a terminal to the private network managed by the access point.

To facilitate this first connection for a large number of users, the network key affixed to the access point may be either replaced or combined with a barcode or a QR code containing the network key. However, the security of the private network in this case again depends on the location of the access point and its physical accessibility to third parties.

The WPS (Wi-Fi Protected Setup) standard itself also proposes to facilitate this first connection by proposing to generate a random network key stronger than the network key provided by the manufacturer of the access point. In order for this random network key to be known to the two equipments to be associated: the access point and the terminal (tablet, printer, smartphone, etc.), the WPS protocol includes a series of message exchanges between the access point and the terminal following an action by the user of the terminal which, when the series of exchanges is performed successfully, finishes by indicating that the protocol is complete, allowing the random network key to be transmitted and the first connection of the terminal to the access point.

The WPS standard provides several modes of operation:
  two "out-of-band" modes, that is to say not using the Wi-Fi network for the series of exchanges of the WPS protocol:
    the USB mode, in which the user connects the terminal to the access point using a USB port via which the series of exchanges of the WPS protocol is transmitted, and
    the NFC mode, in which the user brings the terminal close to the access point in order to allow NFC (near-field communication) communication.
  The drawback of these two modes of implementation of the WPS is that it requires the terminal to be close to the access point with which the user wishes to associate it, which is not always possible: computer, television, printer, etc.
  the PIN mode, in which the user enters an identification number of the access point (number read from the access point, in particular from a label glued to the access point or directly etched or printed thereon, or on a screen of the access point) on his terminal upon the first request to connect the terminal to the access point. The drawback of this method is that it is vulnerable to mass attacks.
  the "pushbutton" mode, in which the user pushes a virtual or physical button on each of the two equipments to be associated: the terminal and the access point.
  In these two last modes, the WPS exchanges are performed between the terminal and the access point via the Wi-Fi network following the action by the user (sending the PIN code to the access point and/or pressing the pushbuttons).

However, regardless of the technique used nowadays for the first connection of a terminal to an access point, this remains sensitive to third-party attacks and to the risks of intrusion by third parties into a private network via the access point.

SUMMARY

One of the aims of the present invention is to rectify drawbacks of the prior art.

One subject of the invention is a method for recovering a network key of an access point to a network implemented by a terminal, the network key allowing the terminal to be associated with the access point upon the first connection of the terminal to the access point, the network key recovery method comprising reception, by a terminal, of a network key sent by an access point via a mediation server, the terminal having been identified by the mediation server by way of an association, prior to the first connection, of an identifier of the terminal and an identifier of the access point.

The key is thus not easily able to be recovered by a third party since it is neither displayed on the access point nor transmitted by the access point directly to the terminal, in particular via a local radio network such as Wi-Fi or Bluetooth (registered trademarks). This limits intrusions into the private network managed by the access point, in particular intrusions linked to the vulnerability of the local radio network. Furthermore, the prior association of an identifier of the terminal with an identifier of the access point makes it possible to avoid tedious actions and possibly sources of connection errors on the part of the user of the terminal upon the first connection of the terminal to the access point.

Advantageously, the network key recovery method comprises, prior to the reception of the network key, transmission of a network key request by the terminal to the mediation server.

The network key is thus received by the terminal only upon request from the terminal, avoiding the terminal from keeping a network key in its memory. If the terminal were to be subject to an intrusion by a third party, this limits the risks of the network key being recovered by a third party directly in the terminal and therefore of intrusion into the private network managed by the access point.

Advantageously, the transmission of a network key request triggers at least one of the following steps:
- triggering establishment of a communication session between the terminal and the mediation server, able to allow a network key to be transmitted from the mediation server to the terminal;
- verification, by the mediation server, that the terminal that transmitted the request corresponds to the terminal whose identifier is associated with an identifier of the access point.

The establishment of the communication session thus allows the mediation server, as soon as the terminal requests it, to transmit the network key as soon as said request is received by the mediation server.

Advantageously, the network key recovery method comprises decryption of the received network key.

Advantageously, the decryption is performed by way of a private key generated by the terminal with a public key transmitted to the mediation server by the terminal upon an association, performed prior to the implementation of the recovery method, of the terminal with the mediation server, the network key having been encrypted by the mediation server by way of the public key.

Another subject of the invention is a method for sending a network key of an access point to a network implemented by an access point, the network key allowing a terminal to be associated with the access point upon the first connection of the terminal to the access point, the network key sending method comprising transmission of the network key by an access point to a terminal via a mediation server, the terminal having been identified by the mediation server by way of an association, prior to the first connection, of an identifier of the terminal and an identifier of the access point.

Advantageously, the transmission of the network key consists of transmission of a message to the mediation server, the message comprising the network key and an identifier of the access point allowing the mediation server to determine an identifier of the terminal associated with the identifier of the access point prior to the first connection.

Advantageously, the network key sending method comprises actuation an actuable device of the access point, triggering the transmission of the network key.

Advantageously, the transmission of the network key by the access point to the mediation server is performed securely.

Another subject of the invention is a method for managing the recovery of a network key of an access point to a network implemented by a mediation server, the network key allowing a terminal to be associated with the access point upon the first connection of the terminal to the access point, the network key recovery management method comprising transmission, by the mediation server to a terminal, of a network key received from an access point, the mediation server having identified the terminal by way of an association, prior to the first connection, of an identifier of the terminal and an identifier of the access point.

Advantageously, the recovery management method comprises encryption of the network key prior to the transmission.

Advantageously, according to one implementation of the invention, the various steps of the method according to the invention are implemented by software or a computer program, this software comprising software instructions intended to be executed by a data processor of a device and being designed to command the execution of the various steps of this method.

The invention therefore also targets a program comprising program code instructions for executing the steps of at least one of the following methods:
- a network key recovery method,
- a network key sending method,
- a network key recovery management method when said program is executed by a processor.

This program may use any programming language, and be in the form of source code, object code, or intermediate code between source code and object code, such as in a partially compiled form, or in any other desirable form.

Another subject of the invention is a terminal comprising a recovery interface for recovering a network key of an access point to a network implemented by a terminal, the network key allowing the terminal to be associated with the access point upon the first connection of the terminal to the access point, the recovery interface comprising a receiver for the reception of a network key sent by an access point via a mediation server, the terminal having been identified by the mediation server by way of an association, prior to the first connection, of an identifier of the terminal and an identifier of the access point.

Another subject of the invention is a mediation server comprising a recovery manager for managing the recovery of a network key of an access point to a network implemented by a mediation server, the network key allowing a terminal to be associated with the access point upon the first connection of the terminal to the access point, the network key recovery manager comprising a transmitter for the transmission, to a terminal, of a network key received from an access point, the mediation server having identified the terminal by way of an association, prior to the first connection, of an identifier of the terminal and an identifier of the access point.

Another subject of the invention is an access point to a network comprising a network key provider, the network key allowing the terminal to be associated with the access point upon the first connection of the terminal to the access point, the network key provider comprising a transmitter for transmitting a message to a terminal via a mediation server, the message comprising the network key of the access point, the terminal having been identified by the mediation server by way of an association, prior to the first connection, of an identifier of the terminal and an identifier of the access point.

BRIEF DESCRIPTION OF THE DRAWINGS

The features and advantages of the invention will become more clearly apparent upon reading the description, given by way of example, and the related figures, in which.

DESCRIPTION OF THE EMBODIMENTS

Figure 1:
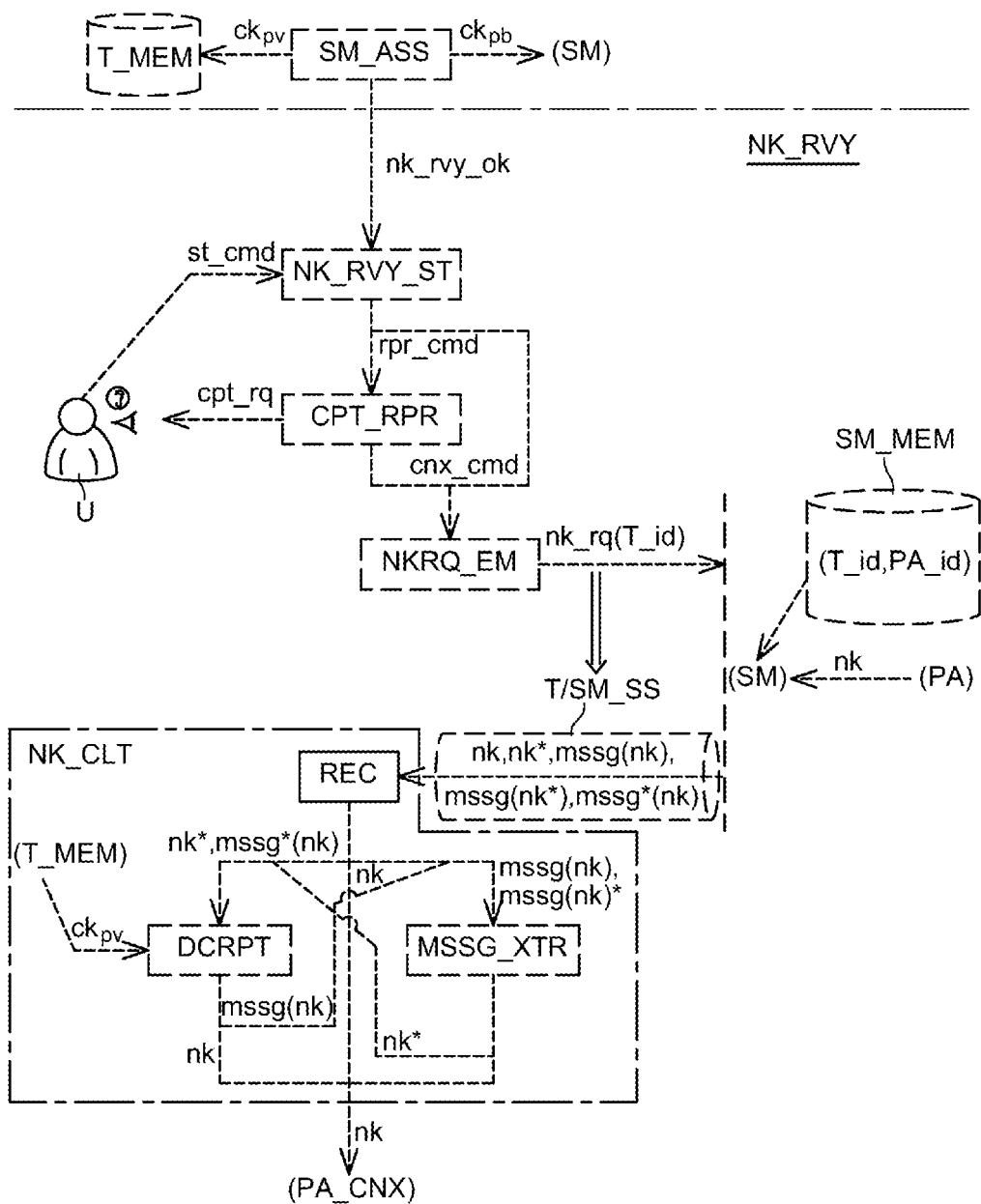
FIG. 1 shows a simplified diagram of a network key recovery method according to the invention.

FIG. 1 illustrates a simplified diagram of a network key recovery method according to the invention.

The method NK_RVY for recovering a network key of an access point to a network is implemented by a terminal T. The network key nk allows the terminal T to be associated with the access point PA upon the first connection of the terminal T to the access point PA. The network key recovery method NK_RVY comprises reception REC, by a terminal T, of a network key nk sent by an access point PA via a mediation server SM. The terminal T has been identified by the mediation server SM by way of an association, prior to the first connection, of an identifier of the terminal T_id and an identifier of the access point P_id.

In particular, the network key recovery method NK_RVY comprises, prior to the reception REC of the network key nk, transmission NKRQ_EM of a network key request nk_rq by the terminal T to the mediation server SM.

In particular, the transmission NKRQ_EM of a network key request triggers at least one of the following steps:
  triggering establishment of a communication session between the terminal and the mediation server T/SM_SS, able to allow a network key nk to be transmitted from the mediation server SM to the terminal T,
  verification, by the mediation server SM, that the terminal T that transmitted the request nk_rq corresponds to the terminal T whose identifier T_id is associated with an identifier of the access point PA_id.

In particular, the network key recovery method NK_RVY comprises decryption DCRPT of the received network key nk*.

In particular, the decryption DCRPT is performed by way of a private key $ck_{pv}$ generated by the terminal T with a public key $ck_{pb}$ transmitted to the mediation server SM by the terminal T upon an association SM_ASS, performed prior to the implementation of the recovery method NK_RVY, of the terminal T with the mediation server SM, the network key nk* having been encrypted by the mediation server SM by way of the public key $ck_{pb}$.

In particular, the prior association with the mediation server SM_ASS authorizes ok the implementation of the network key recovery NK_RVY, in particular by authorizing the starting of the recovery method NK_RVY_ST. For example, the authorization message is sent following the generation of the asymmetric key pair ($ck_{pv}$, $ck_{pb}$), in particular as soon as the public key $ck_{pb}$ of this key pair is transmitted to the mediation server SM and/or as soon as the private key $ck_{pv}$ is recorded in the terminal T, in particular in a memory T_MEM of the terminal T, such as a database, a memory card, etc.

In particular, the network key recovery method NK_RVY comprises a step of starting the method NK_RVY_ST. This starting step NK_RVY_ST is triggered in particular by an action st_cmd by a user U, for example on an input interface of the terminal or by way of a capturing interface, such as a voice interface, a camera, etc. The user U may thus indicate to the terminal T that he would like it to recover the network key of the access point PA whose identifier PA_id has been associated beforehand with an identifier of the terminal T_id. Optionally, when the network key recovery NK_RVY implements decryption DCRPT, the starting step NK_RVY_ST is not authorized if the terminal T has not been associated beforehand with a mediation server SM by way of an asymmetric key pair ($ck_{pv}$, $ck_{pb}$).

Starting the network key recovery NK_RVY_ST directly or indirectly generates a command to transmit a network key request cnx_cmd.

In a first variant embodiment, starting the network key recovery NK_RVY_ST directly generates a command cnx_cmd that controls request transmission NKRQ_EM.

In a second variant embodiment, starting the network key recovery NK_RVY_ST generates a reproduction command rpr_cmd that controls the reproduction CPT_RPR of a message cpt_rq intended for the access point PA. The reproduced message cpt_rq possibly asks a user U of the terminal T to perform an interaction with the access point PA. The reproduction CPT_RPR sends the network key request transmission NKRQ_EM the command cnx_cmd that controls the request transmission NKRQ_EM.

In particular, regardless of the variant embodiment of the generation of the request transmission command cnx_cmd, the request transmission NKRW_EM transmits a network key request nk_rq to a mediation server SM, in particular the mediation server SM_ASS associated beforehand with the terminal T. The network key request nk_rq comprises in particular an identifier of the requesting terminal T_id: nk_rq(T_id).

In particular, the transmission of the network key request nk_rq directly or indirectly triggers the establishment of a communication session between the terminal and the mediation server T/SM_SS, allowing transmission of the network key nk from the mediation server SM to the terminal T. The network key of the access point PA may be transmitted from the mediation server SM to the terminal T without processing nk, in encrypted form nk* (in particular encrypted by way of the public key $ck_{pb}$), integrated into a message mssg(nk), integrated in encrypted form into a message mssg(nk*), integrated into an encrypted message mssg*(nk), etc.

The communication session T/SM_SS between the terminal and the mediation server is in particular a Web socket securing the transmission of the network key.

The network key nk received by the terminal from the mediation server is possibly received by the mediation server SM from the access point PA during the period of execution of the method for the recovery of a network key by the terminal T.

The recovery of the network key on the mediation server by a third party is thus limited to the time during which the method for the recovery of a network key by the terminal is being executed.

In particular, the network key recovery method NK_RVY comprises decryption DCRPT using in particular the private key $ck_{pv}$ to decrypt the encrypted message mssg*(nk) and/or the received encrypted network key nk* or the received encrypted message mssg*(nk). The private key $ck_{pv}$ possibly used by the decryption DCRPT is read by the decryption from a memory of the terminal T_MEM in which it has been recorded beforehand, in particular during the prior association of the terminal with the mediation server SM_ASS.

The use of asymmetric keys to encrypt/decrypt the network key before/after transmission thereof between the mediation server and the terminal thus further reduces the risk of the network key being recovered by a third party, thereby reducing the risks of intrusion into the private network managed by the access point PA.

In particular, the network key recovery method NK_RVY comprises extraction MSSG_XTR for extracting the encrypted or unencrypted network key nk*, nk from the possibly decrypted received message mssg(nk*), mssg(nk).

In particular, the network key recovery method NK_RVY comprises network key collection NK_CLT, comprising one or more of the following steps:
  reception REC of the encrypted or unencrypted network key nk* or nk or of an encrypted or unencrypted message mssg*(nk) comprising the encrypted or unencrypted network key mssg(nk*) or mssg(nk);
  decryption DCRPT of the extracted received encrypted or unencrypted network key nk* or of a received encrypted message mssg*(nk);
  extraction of the encrypted or unencrypted network key nk* or nk from a decrypted or non-decrypted received message mssg.

The network key nk thus received, or even collected, may be used upon a first connection PA_CNX of the terminal T to the access point PA. Optionally, the network key nk is temporarily recorded in the terminal T for a first subsequent connection of the terminal T to the access point PA.

Figure 2:
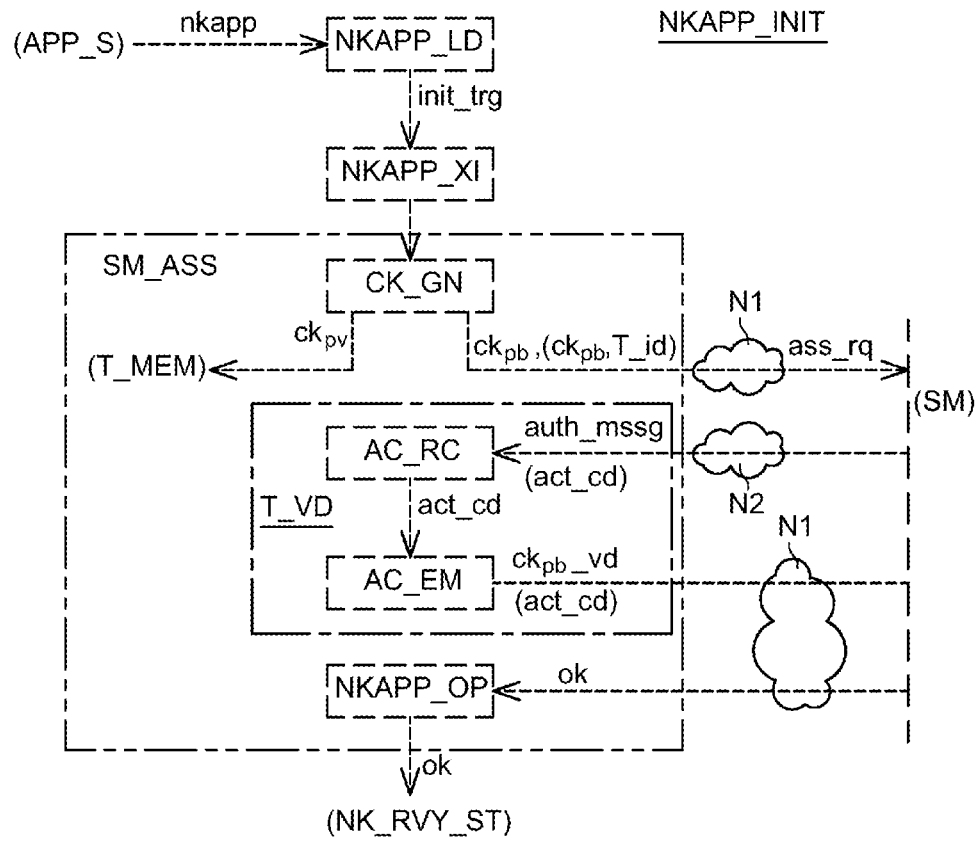
FIG. 2 shows a simplified diagram of the initialization of a network key recovery method according to the invention.

FIG. 2 illustrates a simplified diagram of the initialization of a network key recovery method according to the invention.

The initialization method NKAPP_INIT comprises associating the terminal with the mediation server SM_ASS prior to the network key recovery method NK_RVY, in particular as illustrated in FIG. 1.

In particular, the initialization method NKAPP_INIT comprises loading NKAPP_LD of the network key recovery method by the terminal T, in particular from an application server APP_S. The network key recovery method is in particular loaded in the form of an application nkapp.

In particular, the initialization method NKAPP_INIT comprises execution of the initialization of the network key recovery method NKAPP_XI. The execution of the initialization is triggered init_trg in particular by the end of the loading NKAPP_LD.

The execution of the initialization NKAPP_XI in particular commands the association of the terminal with the mediation server SM_ASS and possibly other steps (not illustrated), such as the initialization of at least one parameter useful for the execution of the network key recovery method, such as in particular reading an identifier of the terminal T_id, and/or searching for an address of a mediation server, etc.

The association with the mediation server SM_ASS in particular transmits an association request ass_rq to associate the terminal T with the mediation server SM.

In particular, the association with the mediation server SM_ASS comprises generation CK_GN of an asymmetric key pair ($ck_{pv}$, $ck_{pb}$). The private key $ck_{pv}$ is recorded in a memory of the terminal T_MEM and the public key $ck_{pb}$ is transmitted to the mediation server SM via a first network N1. The public key $ck_{pb}$ is possibly associated with an identifier of the terminal T_id when it is transmitted to the mediation server, such as the identifier of the terminal T_id associated beforehand with an identifier of an access point PA_id.

The association request message ass_rq possibly comprises the public key $ck_{pb}$ and/or an identifier of the terminal T_id: ass_rq($ck_{pb}$), ass_rq($ck_{pb}$, T_id), ass_rq(T_id), etc.

In particular, the association with the mediation server SM_ASS comprises reception of an activation code for activating the association AC_RC from the mediation server SM via a second network N2. The activation code act_cd is in particular received by the terminal T from the mediation server SM that received a public key $ck_{pb}$ from the terminal T. It allows the mediation server SM to trigger validation of the authentication of the transmitter of the association request by way of the activation code. The activation code reception AC_RC possibly receives an authentication message auth_mssg comprising the activation code act_cd: auth_mssg(act_cd).

In particular, following the reception of an activation code AC_RC, the association with the mediation server SM_ASS comprises transmission of the activation code AC_EM from the terminal T to the mediation server SM via the first network N1. The reception of the activation code AC_RC provides the activation code act_cd to the transmission of the activation code AC_EM after having possibly extracted the activation code act_cd from a received authentication message auth_mssg.

In particular, the association with the mediation server SM_ASS comprises validation of the transmitter of the association request T_VD, comprising reception of the activation code AC_RC from the mediation server SM via a second network N2 followed by transmission of the activation code AC_EM to the mediation server SM via the first network N1.

When the terminal T is a mobile terminal:
  the first network N1 is in particular a mobile Internet network such as the 4G network, the transmission of the public key is in particular performed over a secure Internet link such as https;
  the second network N2 is in particular a 3G mobile telephone network, the transmission of the activation code of the public key is for example an SMS, MMS or a control SMS, etc.

In particular, the association with the mediation server SM_ASS comprises switching the network key recovery method to operational mode NKAPP_OP. Switching to operational mode NKAPP_OP provides in particular an authorization command nk_rvy_ok to execute the network key recovery method NK_RVY, in particular at the start of the network key recovery method NK_RVY_ST.

Figure 3:
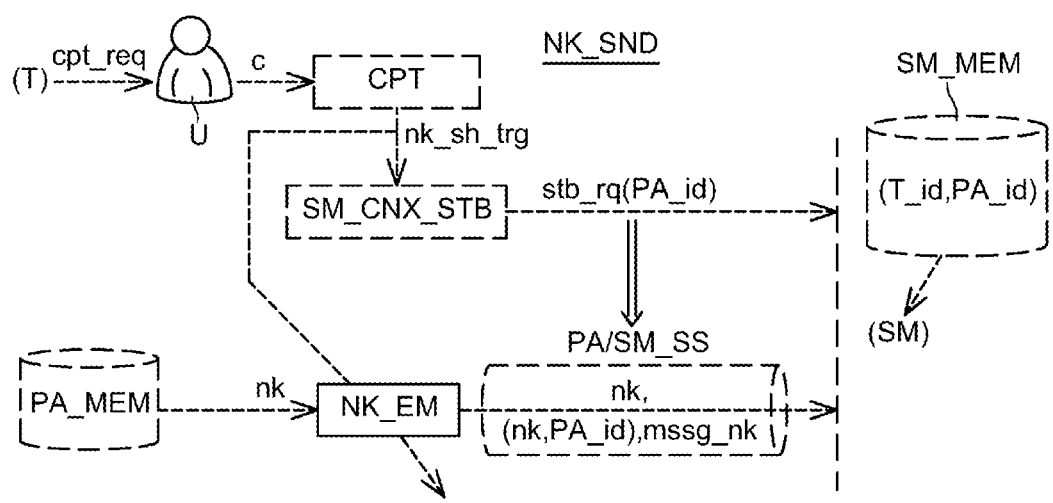
FIG. 3 shows a simplified diagram of a network key sending method according to the invention.

FIG. 3 illustrates a simplified diagram of a network key sending method according to the invention. The method NK_SND for sending a network key of an access point to a network is implemented by an access point PA, the network key nk allowing a terminal T to be associated with the access point PA upon the first connection of the terminal T to the access point PA. The network key sending method NK_SND comprises transmission of a network key NK_EM by an access point PA to a terminal T via a mediation server SM. The terminal T has been identified by the mediation server SM by way of an association, prior to the first connection, of a identifier of the terminal T_id and an identifier of the access point PA_id.

In particular, the network key transmission NK_EM comprises transmission of information comprising the network key of the access point PA and an identifier of this access point (nk, PA_id).

In particular, the network key transmission NK_EM recovers the network key nk from a memory of the access point PA_MEM: a database, an encrypted memory, etc.

In particular, the network key transmission NK_EM consists of transmission of a message mssg nk to the mediation server SM. The message mssg nk comprises the network key nk and an identifier of the access point PA_id, allowing the mediation server SM to determine an identifier of the terminal T_id associated with the identifier of the access point PA_id prior to the first connection.

In particular, the network key sending method NK_SND comprises actuation CPT of an actuable device of the access point, triggering nk_sh_trg the transmission of the network key NK_EM.

A reproduced message cpt_rq as illustrated in FIG. 1 possibly asks a user U of the terminal T to perform an interaction with the access point PA. The user U then performs the interaction c, which triggers the actuation CPT.

In an automated embodiment, the message cpt_rq reproduced by the terminal T leads to an interaction c of the terminal T directly with the access point PA in the vicinity of which the terminal T is located. The interaction c of the terminal T with the access point PA triggers the actuation CPT.

In particular, the network key sending method NK_SND comprises a request SM_CNX_STB to establish a connection of the access point PA to a mediation server SM. The request to establish a connection to the mediation server SM_CNX_STB sends a connection establishment request stb_rq to the mediation server SM. The connection establishment request stb_rq comprises in particular an identifier of the access point PA_id: stb_rq(PA_id). The request SM_CNX_STB to establish a connection of the access point PA to a mediation server SM triggers establishment of a communication session between the access point and the mediation server PA/SM_SS, able to allow transmission of the network key nk from the access point PA to the mediation server SM. The network key transmission NK_EM thus transmits via this communication session PA/SM_SS.

The communication session PA/SM_SS between the access point and the mediation server is in particular a Web socket securing the transmission of the network key.

In particular, the transmission NK_EM of the network key by the access point to the mediation server is performed securely, for example via an https secure hypertext link, or IPSEC, or via a tunnel such as VPN, etc.

Figure 4:
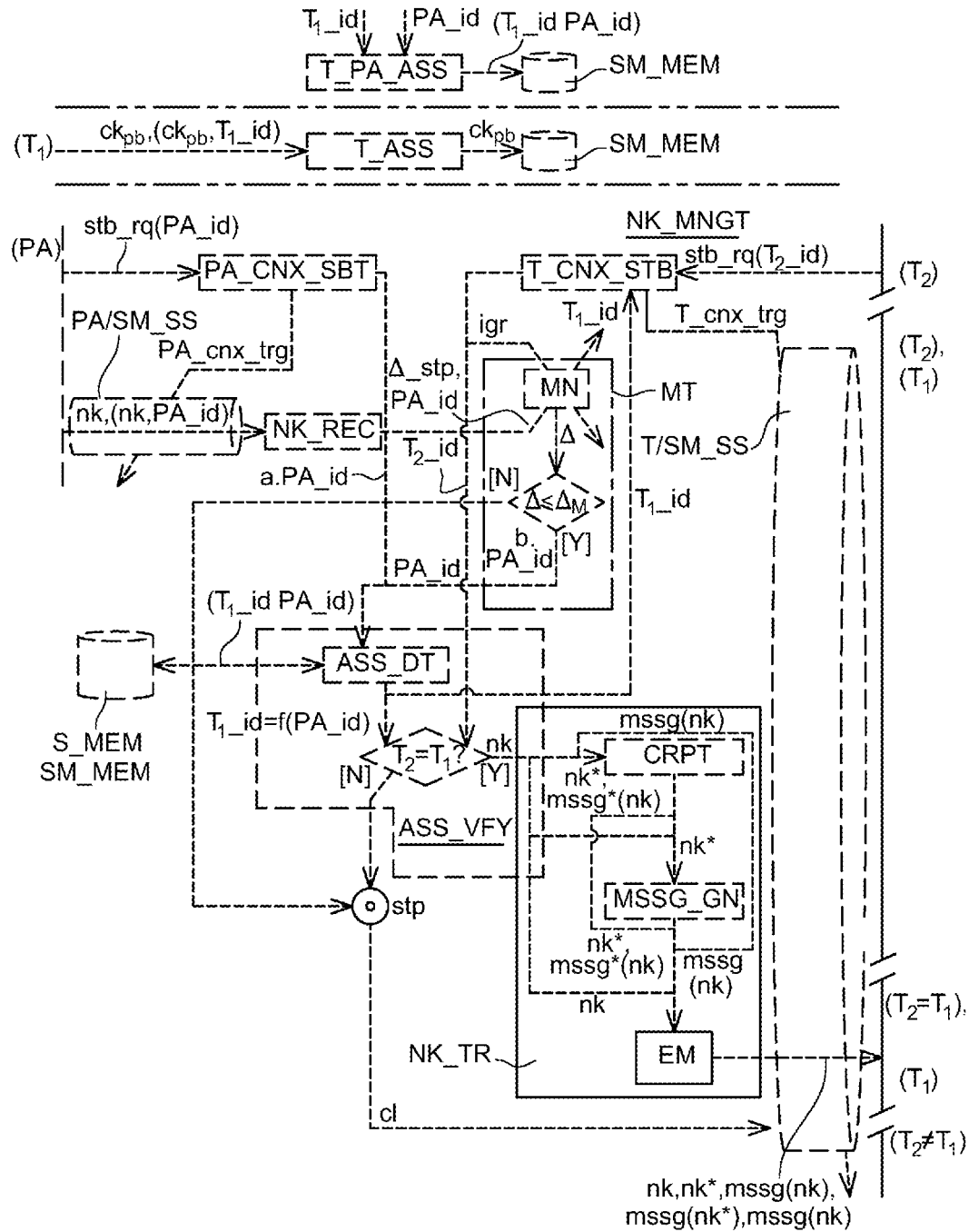
FIG. 4 shows a simplified diagram of a network key recovery management method according to the invention.

FIG. 4 illustrates a simplified diagram of a network key recovery management method according to the invention.

The method NK_MNGT for managing the recovery of a network key of an access point PA to a network is implemented by a mediation server SM, the network key nk allowing a terminal $T_1$ to be associated with the access point PA upon the first connection of the terminal $T_1$ to the access point PA. The network key recovery management method NK_MNGT comprises transmission NK_TR, EM, by the mediation server M to a terminal $T_1$, of a network key nk received from an access point PA. The mediation server SM has identified the terminal $T_1$ by way of an association T/PA_ASS, prior to the first connection, of an identifier of the terminal $T_1$_id and an identifier of the access point PA.

FIG. 4 also illustrates the association T/PA_ASS, prior to the first connection, of an identifier of a terminal $T_1$_id and an identifier of an access point PA. This association of identifiers T/PA_ASS is implemented by a server, in particular the mediation server SM. The pair of identifiers thus associated ($T_1$_id, PA_id) is recorded in particular in a memory of the server SM_MEM, such as a database, etc. In particular, the network key recovery management method NK_MNGT comprises, prior to network key transmission EM, encryption CRPT of the network key nk. The transmission EM thus transmits the encrypted network key nk* or data or a message mssg comprising the encrypted network key nk*. FIG. 4 also illustrates association T_ASS of a terminal $T_2$ with the mediation server transmitting the network key. During the association with a terminal T_ASS, the mediation server receives, from the terminal $T_1$, an encryption key, such as a public key $ck_{pb}$, allowing the mediation server SM to encrypt data, where applicable the network key nk, prior to transmission thereof NK_TR, EM to the terminal $T_1$. Other data, such as the identifier of the terminal $T_1$_id, are possibly transmitted in association with the encryption key $ck_{pb}$. In particular, the mediation server SM stores the data received from the terminal $T_1$, in particular the encryption key $ck_{pb}$, for example in a memory or database SM_MEM.

In particular, the network key recovery management method NK_MNGT comprises encryption CRPT, using in particular the public key $ck_{pb}$ to encrypt a message mssg(nk) and/or the network key nk to be transmitted. The public key $ck_{pb}$ possibly used by the encryption CRPT is read by the encryption from a memory of the mediation server SM_MEM in which it has been recorded beforehand, in particular during the prior association of the terminal with the mediation server SM_ASS.

The use of asymmetric keys to encrypt/decrypt the network key before/after transmission thereof between the mediation server and the terminal thus further reduces the risk of the network key being recovered by a third party, thereby reducing the risks of intrusion into the private network managed by the access point PA.

In particular, the network key recovery management method NK_MNGT comprises message generation MSSG_GN in order to create a possibly encrypted message to be transmitted mssg(nk*), mssg(nk) comprising the encrypted or unencrypted network key nk*, nk.

In particular, the network key recovery management method NK_MNGT comprises network key transmission NK_TR, comprising one or more of the following steps:
  encryption CRPT of the network key to be transmitted nk and/or of a message to be transmitted mssg(nk), mssg (nk*);
  generation MSSG_GN of a message mssg comprising the encrypted or unencrypted network key nk* or nk: mssg(nk*), mssg(nk);
  transmission EM of the encrypted or unencrypted network key nk* or nk or of an encrypted or unencrypted message mssg*(nk) comprising the encrypted or unencrypted network key mssg(nk*) or mssg(nk).

The network key recovery management method NK_MNGT in particular comprises network key reception NK_REC by the mediation server SM from an access point PA. The reception NK_REC allows the mediation server SM to receive a network key nk allowing a terminal $T_1$, $T_2$ to be associated with the access point PA.

In particular, the network key recovery management method NK_MNGT comprises, prior to the network key reception NK_REC, establishment PA_CNX_STB of a connection of the access point PA to a mediation server SM. The establishment of a connection with the mediation server PA_CNX_STB receives a connection establishment request stb_rq from the access point PA. The connection establishment request stb_rq comprises in particular an identifier of the access point PA_id: stb_rq(PA_id). The establishment PA_CNX_STB of a connection of the access point PA to a mediation server SM triggers PA_cnx_trg establishment of a communication session between the access point and the mediation server PA/SM_SS, able to allow transmission of the network key nk from the access point PA to the mediation server SM. The network key reception NK_EM thus receives the network key nk via this communication session PA/SM_SS.

In particular, the network key recovery management method NK_MNGT comprises a search ASS_DT for the terminal $T_1$ whose identifier $T_1$_id has been associated beforehand with an identifier PA_id of the access point PA whose network key nk has been received by the network key recovery management method NK_MNGT. The search ASS_DT is in particular performed based on an identifier of the access point PA_id received with the network key nk: (nk, PA_id). The search ASS_DT comprises in particular reading of the identifier of the terminal $T_1$_id recorded in a memory of a server S_MEM, SM_MEM in association with an identifier of the access point PA_id that provided the network key nk.

In a first variant embodiment of the network key recovery management method NK_MNGT, the network key recovery management method NK_MNGT comprises, prior to the network key transmission NK_TR, EM, establishment T_CNX_STB of a connection of the terminal $T_1$, determined by the search ASS_DT, to the mediation server SM. The establishment T_CNX_STB of a connection of the mediation server SM to the determined terminal $T_1$ triggers T_cnx_trg establishment of a communication session between the mediation server and the determined terminal $T_1$: T/SM_SS, able to allow the transmission NK_TR, EM of the network key nk from the mediation server SM to the determined terminal $T_1$. The network key transmission NK_TR, EM thus transmits the network key nk via this communication session T/SM_SS.

In a second variant embodiment of the network key recovery management method NK_MNGT, the network key recovery management method NK_MNGT comprises, prior to the network key transmission NK_TR, EM, establishment T_CNX_STB of a connection of a terminal $T_2$ to a mediation server SM. The establishment of a connection to the mediation server T_CNX_STB receives a connection establishment request stb_rq from a terminal $T_2$, also called second terminal. The connection establishment request stb_rq comprises in particular an identifier of the second terminal $T_2$_id: stb_rq($T_2$_id). The establishment T_CNX_STB of a connection of the second terminal $T_2$ to a mediation server SM triggers T_cnx_trg establishment of a communication session between the second terminal $T_2$ and the mediation server T/SM_SS, able to allow transmission of the network key nk from the mediation server SM to the terminal $T_2$. The network key transmission NK_TR, EM thus, where applicable, transmits the network key nk via this communication session T/SM_SS.

In particular, in this second variant embodiment of the network key recovery management method NK_MNGT, the network key recovery management method NK_MNGT comprises, prior to the network key transmission NK_TR, EM, verification ASS_VFY as to whether the second terminal $T_2$ corresponds to the terminal, also called first terminal, $T_1$ whose identifier $T_1$_id has been associated beforehand with an identifier PA_id of the access point PA from which the reception NK_REC received the network key nk.

For example, the verification ASS_VFY comprises searching ASS_DT for the first terminal $T_1$ whose identifier $T_1$_id has been associated beforehand with an identifier PA_id of the access point PA whose network key nk has been received by the network key recovery management method NK_MNGT. The search ASS_DT is in particular performed based on an identifier of the access point PA_id received with the network key nk: (nk, PA_id). The search ASS_DT comprises in particular reading of the identifier of the terminal $T_1$_id recorded in a memory of a server S_MEM, SM_MEM in association with an identifier of the access point PA_id that provided the network key nk.

Following the search ASS_DT, the verification ASS_VFY comprises a comparison $T_2=T_1$? between the identifier of the first terminal $T_1$_id determined by the search ASS_DT and an identifier of the second terminal $T_2$_id with which a communication session T/SM_SS has been established. If the two identifiers $T_1$_id, $T_2$_id do not correspond to the same terminal [N]: $T_2 \neq T_1$, then the network key recovery management method NK_MNGT is stopped and, optionally, triggers cl the closure of the session T/SM_SS with the second terminal T2 without network key transmission. If the two identifiers $T_1$_id, $T_2$_id correspond to the same terminal [Y]: $T_2=T_1$, then the network key recovery management method NK_MNGT comprises transmission of the network key NK_TR, EM.

Regardless of the variant embodiment of the network key recovery management method NK_MNGT, the network key recovery management method NK_MNGT comprises timing TM triggered ign by the establishment of the connection with the terminal T_CNX_STB. The timing TM makes it possible to authorize the transmission of the network key to the connected terminal $T_1$, $T_2$ for a limited time $\Delta_M$.

The timing TM in particular comprises an backward countdown of the time starting from a maximum duration $\Delta_M$. The timing TM is stopped $\Delta$_stp directly or indirectly by the reception of the network key NK_REC from the access point PA. In another embodiment, the timing TM comprises a time measurement MN performing counting up of the time starting from the triggering ign of the timing TM. The time measurement MN is stopped $\Delta$_stp directly or indirectly by the reception of the network key NK_REC from the access point PA. The time measurement MN then provides a time $\Delta$ counted down between the triggering time ign, that is to say the time of establishment of a connection between the mediation server SM and the terminal $T_1$, $T_2$, and the time of reception of the network key from the access point PA. The timing TM then comprises a comparison between the measured time $\Delta$ and the maximum duration $\Delta_M$: $\Delta \leq \Delta_M$?

If the timing MN is stopped (in backward countdown mode or not) directly by the reception of the network key NK_REC, it is the reception NK_REC that sends the command $\Delta$_stp to the timing (without an intermediate step). If the timing MN is stopped (in backward countdown mode or not) indirectly by the reception of the network key NK_REC, it is the verification ASS_VFY performed following the reception of the network key NK_REC that sends the command Δ_stp to the timing (without an intermediate step), in particular on the condition that the verification ASS_VFY authorizes the transmission [Y] (this reduces computing costs).

Depending on the embodiment, if the remaining timed time is not zero (backward countdown), or if the measured time Δ is less than or equal to the maximum duration $Δ_M$: [Y], then the transmission of the network key NK_TR, EM is authorized. As soon as the timed time is zero (backward countdown), or if the measured time Δ is greater than the maximum duration $Δ_M$: [N], then the network key recovery management method NK_MNGT is stopped stp without transmission of the network key to the terminal $T_1$, $T_2$.

In one embodiment of the network key recovery management method NK_MNGT comprising both the verification ASS_VFY of the identifier of the terminal and the timing TM, it is sufficient for at least one of the two steps out of the verification ASS_VFY and the timing TM to command the stoppage stp without transmission of the network key, such that the network key recovery management method NK_MNGT is stopped stp without transmission of the network key.

In particular, the timing MN receives the network key nk from the reception NK_REC and provides it, if the maximum duration $Δ_M$ is not exceeded:
  either to the verification ASS_VFY, which in turn provides the network key nk to the transmission NK_TR on the condition that the second terminal (that is to say the terminal $T_2$ to which the mediation server SM is connected) corresponds to the first terminal (that is to say the terminal $T_1$ whose identifier $T_1$_id has been associated with the identifier PA_id of the access point from which the mediation server SM received the network key nk),
  or to the transmission NK_TR.
In particular, the timing MN receives or recovers:
  an identifier of the access point PA_id from the access point from which the mediation server SM received the network key nk, in particular when the timing triggered by the network key reception NK_REC is stopped Δ_stp, and/or
  an identifier of the second terminal $T_2$_id, that is to say the terminal $T_2$ to which the mediation server SM is connected, in particular of the establishment of a connection to the second terminal T_CNX_STB when the timing is triggered ign by the establishment of a connection to the second terminal T_CNX_STB,
  and provides it or them to the verification ASS_VFY.
In particular, the verification ASS_VFY receives or recovers:
  an identifier of the access point PA_id from the access point from which the mediation server SM received the network key nk, in particular directly from the network key reception NK_REC or from the establishment of a connection to the access point PA_CNX_STB or indirectly from the timing MN (for example, only when this authorizes the transmission of the network key in order to reduce computing costs), and/or
  an identifier of the second terminal $T_2$_id, that is to say the terminal $T_2$ to which the mediation server SM is connected, in particular directly from the establishment of a connection to the second terminal T_CNX_STB when the timing is triggered ign by the establishment of a connection to the second terminal T_CNX_STB or indirectly from the timing MN (for example, only when this authorizes the transmission of the network key in order to reduce computing costs), and provides it or them to the verification ASS_VFY.

Figure 5:
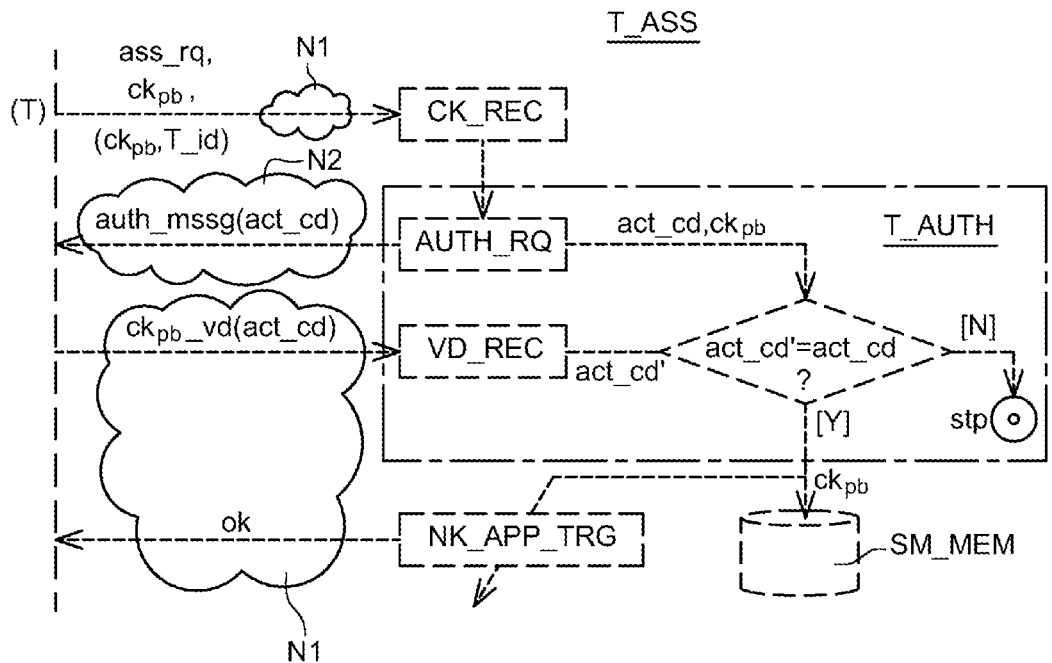
FIG. 5 shows a simplified diagram of a method for associating a mediation server with a terminal upon the initialization of a network key recovery method according to the invention.

FIG. 5 illustrates a simplified diagram of a method for associating a mediation server with a terminal T_ASS upon the initialization of a network key recovery method NKAPP_INIT according to the invention. The association of the terminal T with the mediation server T_ASS comprises in particular reception of an association request ass_rq to associate the terminal T with the mediation server SM.

In particular, the public key $ck_{pb}$ was generated during the generation of an asymmetric key pair ($ck_{pv}$, $ck_{pb}$) by the terminal T. The received public key $ck_{pb}$ is possibly received in association with an identifier of the terminal T_id upon receipt thereof CK_REC by the mediation server SM, such as the identifier of the terminal T_id associated beforehand with an identifier of an access point PA_id.

In particular, the association with the terminal T_ASS comprises transmission of an activation code for activating the association AUTH_RQ to the terminal T via a second network N2. The activation code act_cd is in particular transmitted by the mediation server SM to the terminal T that transmitted the received public key $ck_{pb}$. It allows the mediation server SM to trigger validation of the authentication of the transmitter of the association request by way of the activation code. The transmission of the activation code AUTH_RQ possibly transmits an authentication message auth_mssg comprising the activation code act_cd: auth_mssg(act_cd).

In particular, following the transmission of an activation code AUTH_RQ, the association with the terminal T_ASS comprises reception of the activation code VD_REC from the terminal T by the mediation server SM via the first network N1.

In particular, the association with the terminal T_ASS comprises authentication of the terminal transmitting the association request T_AUTH, comprising transmission of the activation code AUTH_RQ by the mediation server SM via a second network N2 followed by the reception of the activation code VD_REC by the mediation server SM via the first network N1.

The method for association with the terminal T_ASS in particular comprises a comparison between the activation code act_cd transmitted during the transmission AUTH_RQ and the activation code act_cd' received during the reception of the activation code VD_REC: act_cd'=act_cd?. If the two activation codes are identical [Y], the terminal T is authenticated and, where applicable, the received public key $ck_{pb}$ is stored by the mediation server SM in a memory or database SM_MEM. If the two activation codes are not identical [N], the terminal T is not authenticated and, where applicable, the received public key $ck_{pb}$ is not kept by the mediation server.

In particular, if the terminal T is authenticated [Y], the association method T_ASS comprises triggering the switching of the network key recovery method to operational mode NK_APP_TRG by transmitting a trigger message ok to the terminal T.

One embodiment of at least one of the methods illustrated in FIGS. 1 to 5 is a program comprising program code instructions for executing the steps of at least one of the following methods:
  the network key recovery method NK_RVY,
  the network key sending method NK_SND,
  the network key recovery management method NK_MNGT
  when said program is executed by a processor.

Figure 6:
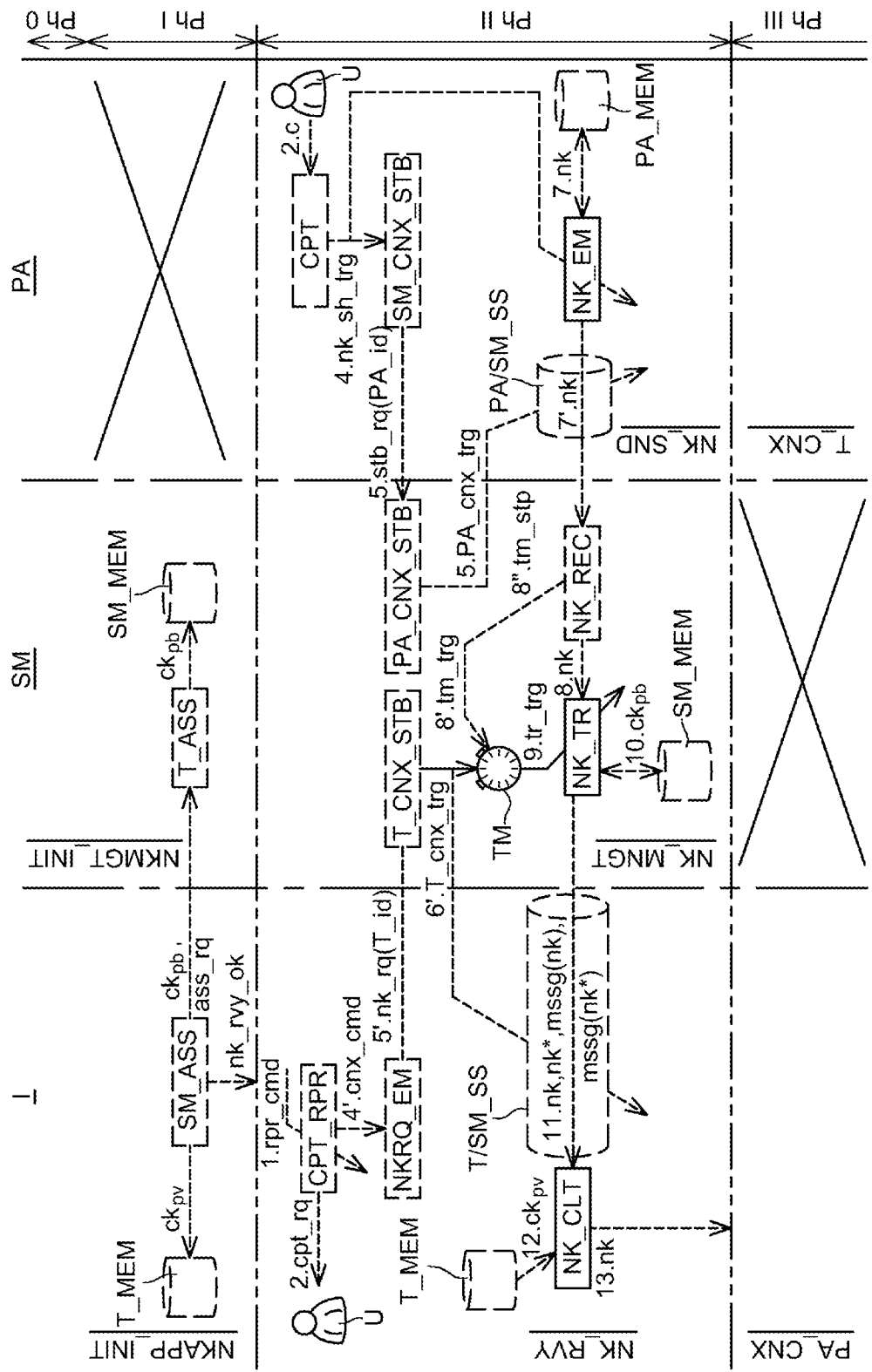
FIG. 6 shows a simplified diagram of exchanges during the implementation of network key sending, network key recovery management and network key recovery methods according to the invention.

FIG. 6 illustrates a simplified diagram of exchanges during the implementation of the network key sending, network key recovery management and network key recovery methods according to the invention.

In a preliminary phase Ph0 (not illustrated in FIG. 6), the identifiers of a terminal T_id and of an access point PA_id are associated T/P_ASS within a server, such as a server of a trusted third party or the mediation server according to the invention (cf. FIG. 4).

In an initialization phase PhI, the terminal T implements association with a mediation server SM_ASS, in particular by executing a method NKAPP_INIT for initializing a network key recovery method, and the mediation server implements association with a terminal T_ASS, in particular by executing a method NKMNGT_INIT for initializing a network key recovery management method.

The association with the mediation server SM_ASS in particular transmits an association request ass_rq to associate the terminal T with the mediation server SM.

In particular, the association with the mediation server SM_ASS generates an asymmetric key pair ($ck_{pv}$, $ck_{pb}$). The private key $ck_{pv}$ is recorded in a memory of the terminal T_MEM and the public key $ck_{pb}$ is transmitted to the mediation server SM. The transmitted public key $ck_{pb}$ is possibly associated with an identifier of the terminal T_id when it is transmitted to the mediation server, such as the identifier of the terminal T_id associated beforehand with an identifier of an access point PA_id.

The association request message ass_rq possibly comprises the public key $ck_{pb}$ and/or an identifier of the terminal T_id: ass_rq($ck_{pb}$), ass_rq($ck_{pb}$, T_id), ass_rq(T_id), etc.

The association of the mediation server T_ASS with the terminal T comprises in particular reception of the association request ass_rq to associate the terminal T with the mediation server SM. Where applicable, the public key $ck_{pb}$ received with this request ass_rq is stored by the mediation server SM in a memory or database SM_MEM.

In particular, the methods NKAPP_INIT for initializing a network key recovery method and NKMNGT_INIT for initializing a network key recovery management method furthermore implement, respectively, validation of the transmitter of the association request T_VD and authentication of the terminal transmitting the association request T_AUTH before recording, respectively, the private and public keys $ck_{pv}$ and $ck_{pb}$.

In particular, the validation of the transmitter T_VD in particular provides an authorization command nk_rvy_ok to execute the network key recovery method NK_RVY triggering the network key recovery phase PhII.

During the network key recovery phase PHIL:
the access point PA implements a network key sending method NK_SND,
the mediation server implements a network key recovery management method NK_MNGT, and
the terminal T implements a network key recovery method NK_RVY.

The sending method NK_SND comprises transmission NK_EM of a network key from the access point PA to a mediation server SM.

The network key recovery management method NK_MNGT comprises transmission NK_TR of the network key received from the access point PA by the mediation server SM, the network key nk is transmitted to the terminal T whose identifier T_id was associated, during the preliminary phase Ph0, with the identifier of the access point PA that provided the network key nk.

The network key recovery method NK_RVY comprises reception NK_CLT, from the mediation server SM with which the terminal T was associated during the initialization phase PhI, of a network key of the access point PA whose identifier PA_id was associated with its identifier T_id during the preliminary phase Ph0.

In one particular embodiment illustrated in FIG. 6, the network key recovery method NK_RVY comprises reproduction of a message CPT_RPR, triggered in particular by a reproduction command 1.*rpr*_cmd. The reproduction command 1.*rpr*_cmd is generated in particular when the recovery is started NK_RVY_ST (cf. FIG. 1).

The reproduced message is intended directly or indirectly for the access point PA whose identifier P_id was associated, during the preliminary phase Ph0, with the identifier of the terminal T reproducing the message. If the reproduced message is intended indirectly for the access point PA, it is in particular read, listened to, etc. by a user U of the terminal T. The message is in this case a request for action 2.*cpt*_rq, triggering an action 3.*c* by the user U in relation to the access point PA. If the reproduced message is intended directly for the access point PA, the message 3.*c* is reproduced CPT_RPT by the terminal T.

The sending method NK_SND comprises in particular capturing CPT respectively of the action by the user U in relation to the access point or of the message reproduced by the terminal T: 3. c. The capturing CPT directly or indirectly triggers 4.*nk*_sh_trg the transmission NK_EM of the network key to the mediation server.

In particular, the sending method comprises a request to establish a connection of the access point to the mediation server SM_CNX_STB. The request to establish a connection of the access point to the mediation server SM_CNX_STB is in particular triggered 4.*nk*_sh_trg by the capturing CPT. The request to establish a connection of the access point to the mediation server SM_CNX_STB sends in particular, to the mediation server SM, a request to establish a connection 5.*stb*_rq possibly comprising an identifier of the access point PA_id: 5.*stb*_rq(PA_id).

In particular, the network key recovery management method NK_MNGT comprises establishment of a connection of the mediation server to the access point PA_CNX_STB, triggered by the connection establishment request 5.*stb*_rq from the access point PA. The establishment of a connection of the mediation server to the access point PA_CNX_STB triggers 6. PA_cnx_trg the establishment of a communication session between the mediation server and the access point PA/SM_SS.

The transmission NK_EM thus transmits 7'.nk the network key to the mediation server SM using this communication session between the mediation server and the access point PA/SM_SS.

In particular, the network key recovery management method NK_MNGT comprises network key reception NK_REC, which receives the network key 7'.nk transmitted by the access point PA via the communication session PA/SM_SS established between the access point PA and the mediation server SM.

In particular, the network key reception NK_REC provides the received network key 8.*nk* to the network key transmission NK_TR.

In particular, the network key recovery method NK_RVY comprises transmission NKRQ_EM of a network key request. The network key request transmission NKRQ_EM is triggered 4'.cnx_cmd by the reproduction CPT_RPR. The network key request NKRQ_EM sends in particular, to the mediation server SM, a network key request 5'.nk_rq possibly comprising an identifier of the terminal T_id: 5'.nk_rq (T_id).

This network key request NKRQ_EM is made in particular in parallel with the request to establish a connection of the access point to the mediation server SM_CNX_STB of the sending method NK_SND.

In particular, the network key recovery management method NK_MNGT comprises establishment of a connection of the mediation server to the terminal T_CNX_STB, triggered by the network key request 5'.nk_rq from the terminal T. The establishment of a connection of the mediation server to the terminal T_CNX_STB triggers 6'.T_cnx_trg the establishment of a communication session between the mediation server and the terminal T/SM_SS.

In particular, the management method NK_MNGT implements the steps of establishing the connection of the mediation server to the terminal T_CNX_STB and of establishing a connection of the mediation server to the access point PA_CNX_STB in parallel.

In particular, the management method NK_MNGT implements the steps of establishing the connection of the mediation server to the terminal T_CNX_STB and of establishing a connection of the mediation server to the access point PA_CNX_STB simultaneously.

In particular, in one embodiment in which the mediation server does not receive a network key request 5'.nk_rq from a terminal T, the network key recovery management method comprises a search ASS_DT (cf. FIG. 4) that makes it possible to search for the identifier of the terminal T_id associated with the identifier of the access point that provided the network key 7'.nk. The search ASS_DT then triggers the establishment of a connection T_CNX_STB to the terminal identified by the search T.

In particular, the transmission of the network key NK_TR is triggered directly or indirectly by the establishment of the connection of the mediation server to the terminal T_CNX_STB.

In particular, the network key recovery management method comprises timing TM. The establishment of the connection of the mediation server to the terminal T_CNX_STB in particular triggers 8'.tm_trg timing TM. The timing TM is stopped 8".tm_stp by the reception NK_REC of a network key nk from the access point PA. If the transmission of the network key NK_TR is triggered indirectly by the establishment of a connection to the terminal T_CNX_STB, it is the timing TM that triggers the transmission of the network key NK_TR.

In particular, the network key recovery management method comprises verification ASS_VFY (cf. FIG. 4) that makes it possible to verify whether the terminal T requesting the network key is the terminal whose identifier has been associated beforehand with an identifier of the access point PA whose network key is requested. The verification ASS_VFY authorizes the transmission of the network key NK_TR if the verification is positive [Y].

In particular, the transmission of the network key NK_TR comprises encryption CRPT and/or integration of the network key into a message or data packet MSSG_GN (cf. FIG. 4). The network key transmission NK_TR thus transmits either the encrypted or unencrypted network key nk* or nk or an encrypted or unencrypted message comprising the encrypted or unencrypted network key mssg*(nk) or mssg (n*), mssg(nk), nk*, mssg(nk), mssg(nk*), mssg*(nk) via the communication session T/SM_SS established between the terminal T and the communication server to the terminal T.

In particular, the encryption is performed using the public key $ck_{pb}$ stored during the initialization phase PhI.

In particular, the network key collection NK_CLT comprises decryption DCRPT and/or extraction MSSG_XTR of the network key from a message or data packet comprising the network key received from the mediation server SM (cf. FIG. 4). The decryption is performed in particular using the private key $ck_{pv}$ stored during the initialization phase PhI.

The collection NK_CLT provides in particular the received, possibly decrypted and/or extracted network key 13.nk to a method for associating the terminal with an access point PA_CNX that will be implemented in a subsequent phase PhIII.

Figure 7:
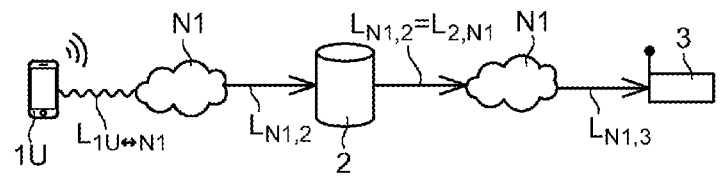
FIG. 7 shows a simplified diagram of a communication architecture implementing the invention.

FIG. 7 illustrates a simplified diagram of a communication architecture implementing the invention.

In particular, the system implemented by the invention consists of:

- a network key recovery device implemented in a communication terminal $1_U$, in particular a mobile telephone. The network key recovery device is implemented in particular in the form of a mobile application implemented by a processor of the communication terminal $1_U$.
- a mediation server 2 located between a communication terminal $1_U$ and an access point 3, such as a box (for example LiveBox, registered trademark) or a modem. The mediation server implements an exchange, between the access point 3 and the terminal $1_U$, of a network key of the access point 3, in particular in an encrypted manner. The mediation server furthermore authenticates in particular the two components of the system according to the invention, specifically the communication terminal $1_U$ and the access point 3. The mediation server 2 therefore constitutes a fulcrum between the access point 3 and the communication terminal $1_U$.
- an actuable device triggering the transmission of the network key to the communication terminal $1_U$, the actuable device being implemented in the access point 3. The actuable device is in particular the WPS button of the access point 3, and then the only action by the user U of the terminal $1_U$ is that of pressing the WPS button of the access point 3.

In particular, the access point 3 is connected to the mediation server 2 via a communication network N1, in particular an Internet network. For example, for its exchanges with the access point 3, the mediation server 2 is connected L2,N1 to the network N1 via a TCP (for "Transmission Control Protocol") link. The access point 3 is possibly connected to the network N1 by way of a TCP link and/or of a specialized link, such as https or IPsec.

In particular, the communication terminal $1_U$ is connected to the mediation server 2 via a communication network N1, in particular an Internet network. For example, for its exchanges with the communication terminal $1_U$, the mediation server 2 is connected LN1,2 to the network N1 via a TCP link. The communication terminal $1_U$ is possibly connected to the network N1 by way of a mobile data link, such as 4G, 5G etc.

Figure 8A:
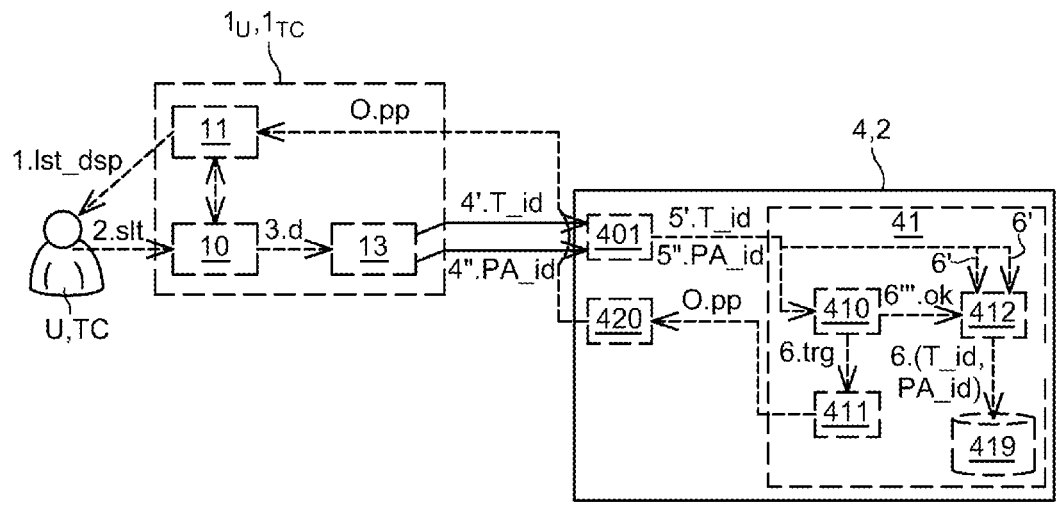
FIG. 8a shows a simplified diagram of a communication architecture comprising a terminal, a mediation server and an access point according to the invention, detailing the devices implemented during the prior association of an identifier of the access point with an identifier of the terminal.
Figure 8B:
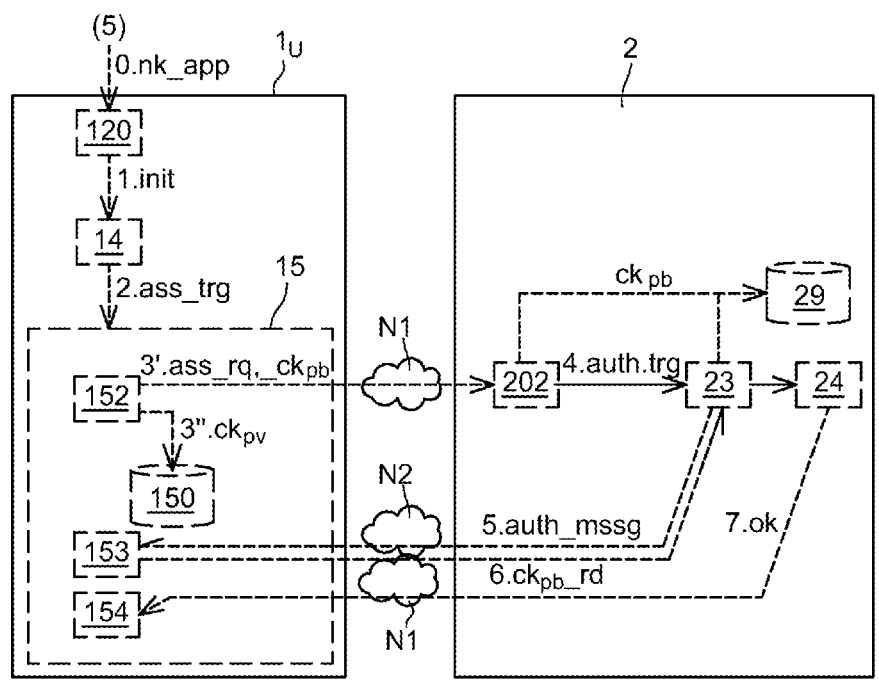
FIG. 8b shows a simplified diagram of a communication architecture comprising a terminal, a mediation server and an access point according to the invention, detailing the devices implemented during the initialization of the network key recoverer of the terminal.
Figure 8C:
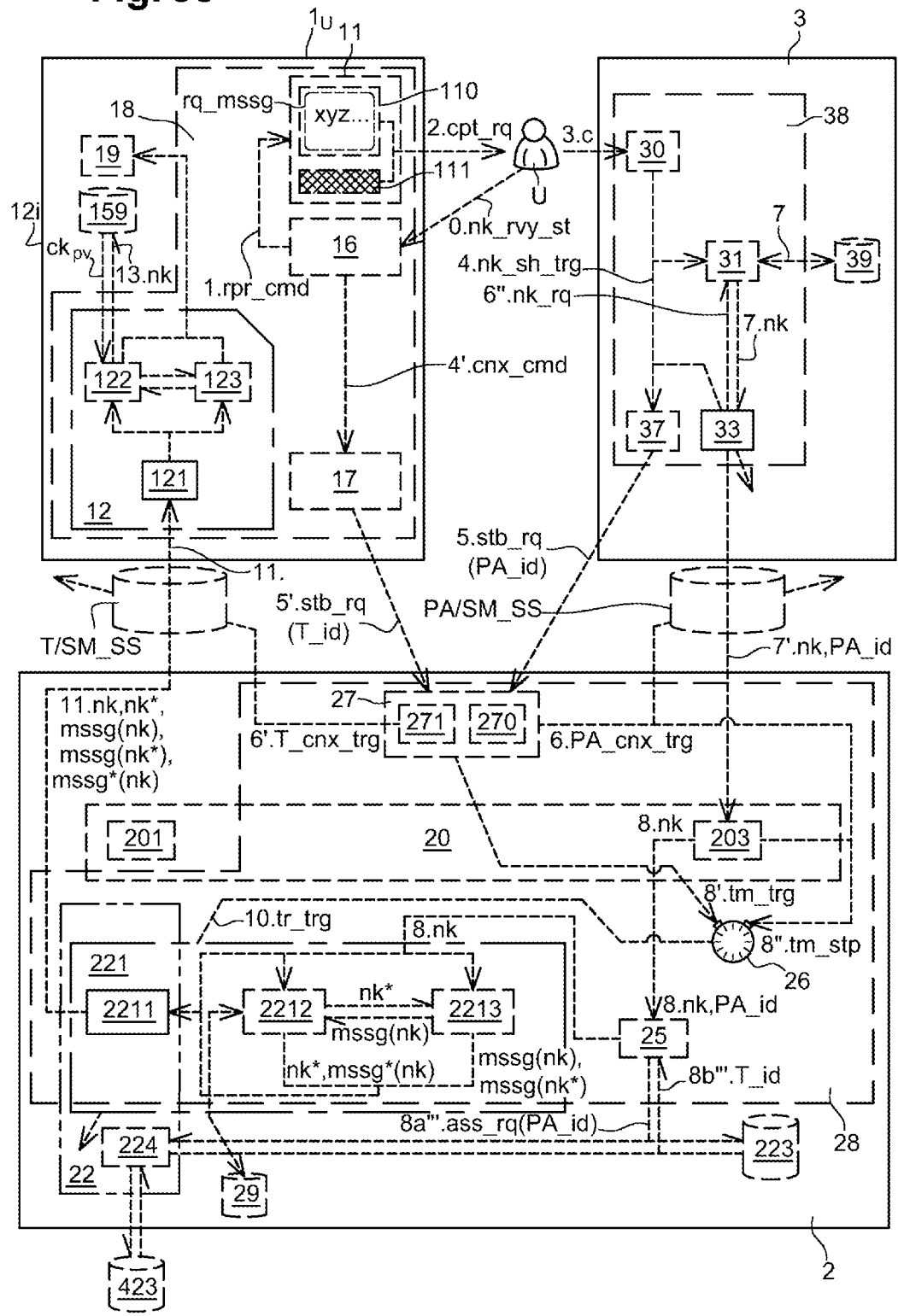
FIG. 8c shows a simplified diagram of a communication architecture comprising a terminal, a mediation server and an access point according to the invention, detailing the devices implemented during the implementation of the network key recoverer of the terminal.

FIGS. 8a, 8b and 8c illustrate simplified diagrams of a communication architecture comprising a terminal, a mediation server and an access point according to the invention, detailing the devices implemented respectively during the prior association of an identifier of the access point with an identifier of the terminal, during the initialization of the network key recoverer of the terminal, and during the implementation of the network key recoverer of the terminal.

FIG. 8a corresponds to an architecture implementing the prior association, in particular as illustrated in FIG. 4.

The architecture implementing the prior association comprises:
- a communication terminal $1_U$, $1_{TC}$, respectively of a user U or of a trusted third party TC (in particular of the provider of an access point 3),
- a server, respectively a trusted third-party server 4 or a mediation server 2 of the architecture implementing the network key recovery according to the invention.

In particular, the terminal $1_U$, $1_{TC}$ comprises an identifier transmitter 13 transmitting an identifier 4'.T_id of a communication terminal of a user $1_U$ and an identifier 4".PA_id of an access point 3.

For example, if the terminal $1_{TC}$ is the terminal of a trusted third party TC, such as an access point vendor, the identifier of the communication terminal is an identifier of at least one communication terminal of a user or of a group of users (for example of a family) purchasing an access point from the vendor, and the identifier of the access point is an identifier of the access point that is sold.

In another usage example, if the terminal is the terminal $1_U$ of a user U, the identifier of the communication terminal is either the identifier of this communication terminal of the user $1_U$ or an identifier of at least one communication terminal of this user U or of a group of users (for example of a family) including this user U, recorded in a secure client file on a third-party server, for example the trusted third-party server 4. Plus, the identifier of the access point is an identifier of an access point recorded in a secure client file associated with this user U on a third-party server, for example the trusted third-party server 4.

In particular, the server 2, 4 comprises an identifier receiver 401 receiving, from the communication terminal $1_U$, $1_{TC}$, an identifier 4'.T_id of a communication terminal of a user $1_U$ and an identifier 4".PA_id of an access point 3, in particular the identifiers transmitted by the terminal $1_U$, $1_{TC}$.

In particular, the server 2, 4 comprises a coupler 412 associating the two identifiers 6'. T_id and 6".PA_id provided by the receiver 401. The coupler 412 possibly stores the associated identifiers 7.(T_id, PA_id) in particular in a memory or database 419 possibly implemented in the server 2, 4.

In particular, the server 2, 4 comprises a verifier 410 that determines whether all of the identifiers required by the coupler 412 have been received. If all of the identifiers have been received, the verifier 410 triggers 6'''.Ok the coupler 412.

In particular, the server 2, 4 comprises an identifier requester 411 and/or a transmitter 420. If the verifier 410 determines that all of the identifiers have not been received, for example when the receiver 401 has received only the identifier of the terminal 5'. T_id, the verifier 410 triggers trg the identifier requester 411, which generates a request 0.pp intended for the terminal $1_U$, $1_{TC}$. The transmitter 420 sends the request 0.pp to the terminal $1_U$, $1_{TC}$.

In particular, the terminal $1_U$, $1_{TC}$ comprises a reproduction interface 11. The reproduction interface 11 makes it possible in particular to reproduce the identifier request intended, respectively, for the user U and the trusted third party TC.

In particular, the terminal $1_U$, $1_{TC}$ comprises a capturing and/or input interface 10. The capturing interface 10 allows the user U, TC to interact with the terminal $1_U$, $1_{TC}$ in order to indicate and/or select an access point identifier PA_id.

For example, the identifier requester 411 provides one or more lists of terminal identifiers and/or of access points 0.pp, which are sent to the terminal $1_U$, $1_{TC}$. The list of terminal identifiers are in particular terminals associated with the user U or with a group (family) to which the user U belongs and the list of access point identifiers comprises the access points recorded in a client file associated with this user U or consists of the identifier of the access point that is sold. These lists of identifiers are reproduced by the terminal $1_U$, $1_{TC}$ allowing, respectively, the user U and the trusted third party TC to select 2.slt, respectively, a terminal and an access point from the list.

For example, assume that the identifier requester initially provides a list of terminal identifiers from which the user U or the trusted third party TC selects, on his terminal $1_U$, $1_{TC}$, a terminal whose transmitter 13 receives 3.d the identifier, which it transmits 4'.T_id to the server 2, 4. The verifier 410 determines that the access point identifier is missing and triggers 6.trg the requester 411, which returns the list of access points 0.pp. The user U or the trusted third party TC then selects, on his terminal $1_U$, $1_{TC}$, an access point from the list whose transmitter 13 receives 3.d the identifier, which it transmits 4".PA_id to the server 2, 4. The verifier 410 then triggers the coupler 412, which associates the identifiers 7.(T_id, PA_id).

In particular, the server 2, 4 comprises association means comprising the coupler 412 and at least one of the following devices:
- the verifier 410,
- the memory or database 419,
- the requester 411.

FIG. 8b corresponds to an architecture implementing the initialization, in particular as illustrated in at least one of the following figures: FIG. 2, FIG. 5, FIG. 6.

The architecture implementing the initialization comprises:
- a communication terminal $1_U$ of a user U,
- a mediation server 2.

In particular, the terminal $1_U$ comprises a coupler 15 for coupling the terminal $1_U$ to the mediation server 2, associating the terminal $1_U$ with the mediation server 2 prior to the network key recovery, in particular as illustrated in FIG. 2 or FIG. 6.

In particular, the terminal $1_U$ comprises a loader 120 for loading the network key recovery method, in particular an application loader for loading an application when the network key recovery device is implemented in the form of an application executed by a processor of the terminal $1_U$, by way of the terminal 1 in particular from an application server 5. The network key recovery method is in particular loaded in the form of an application 0.nkapp.

In particular, the terminal $1_U$ comprises a network key recovery initializer 14, in particular the initializer 14 comprises a processor implementing initialization of a network key recovery method, for example in the form of a network key recovery application, or initializes a network key recoverer implemented in the terminal $1_U$. The initializer 14 is in particular triggered 1.ini by the loader 120 as soon as the end of the loading of the network key recovery method is loaded.

The initializer 14 in particular controls the coupler 15 for coupling the terminal to the mediation server and possibly other devices (not illustrated), such as an initializer for initializing at least one parameter of the network key recoverer or useful for the execution of the network key recovery method, such as in particular reading an identifier of the terminal T_id, and/or searching for an address of a mediation server, etc.

The coupler 15 for coupling to the mediation server in particular transmits an association request ass_rq to associate the terminal $1_U$ with the mediation server 2. The server 2 in particular comprises a receiver 202 for receiving an association request ass_rq to associate the terminal T with the mediation server SM.

In particular, the coupler 15 for coupling to the mediation server SM_ASS comprises a generator 152 for generating an asymmetric key pair ($ck_{pv}$, $ck_{pb}$). The private key $ck_{pv}$ is recorded in a memory of the terminal 150 and the public key $ck_{pb}$ is transmitted to the mediation server 2 via a first network N1. The public key $ck_{pb}$ is possibly associated with an identifier of the terminal T_id when it is transmitted to the mediation server, such as the identifier of the terminal T_id associated beforehand with an identifier of an access point PA_id.

The association request message ass_rq possibly comprises the public key $ck_{pb}$ and/or an identifier of the terminal T_id: ass_rq($ck_{pb}$), ass_rq($ck_{pb}$, T_id), ass_rq(T_id), etc.

In particular, the server 2 comprises an authenticator 23. The authenticator 23 comprises a transmitter (not illustrated) for transmitting an activation code for activating the association to the terminal T via a second network N2. The activation code act_cd is in particular transmitted by the mediation server 2 to the terminal $1_U$ that transmitted the received public key $ck_{pb}$. It allows the mediation server 2 to trigger validation of the authentication of the transmitter of the association request by way of the activation code.

The transmitter of the activation code AUTH_RQ possibly transmits an authentication message 5.auth_mssg comprising the activation code act_cd: auth_mssg(act_cd).

In particular, the coupler 15 for coupling to the mediation server SM_ASS comprises an authentication transmitter/receiver 153 comprising in particular a receiver receiving an activation code for activating the association from the mediation server 2 via a second network N2. The activation code act_cd is in particular received by the terminal $1_U$ from the mediation server 2 that received a public key $ck_{pb}$ from the terminal $1_U$. It allows the mediation server 2 to trigger validation of the authentication of the transmitter of the association request by way of the activation code. The authentication transmitter/receiver 153 possibly receives an authentication message auth_mssg comprising the activation code act_cd: auth_mssg(act_cd).

In particular, following the reception of an activation code AC_RC, the authentication transmitter/receiver 153 comprises a transmitter that transmits the activation code AC_EM from the terminal $1_U$ to the mediation server 2 via the first network N1. Following the reception of the activation code by the authentication transmitter/receiver 153, the receiver provides the activation code act_cd to the transmitter of the activation code implemented in the authentication transmitter/receiver 153 after having possibly extracted the activation code act_cd from a received authentication message auth_mssg.

In particular, the authenticator 23 comprises an activation code receiver (not illustrated) that, following the transmission of an activation code by the transmitter of the authenticator 23, receives the activation code 6.$ck_{pb}$_vd from the terminal $1_U$ via the first network N1.

When the terminal T is a mobile terminal:
the first network N1 is in particular a mobile Internet network such as the 4G network, the transmission of the public key is in particular performed over a secure Internet link such as https;
the second network N2 is in particular a 2G or 3G mobile telephone network, the transmission of the activation code of the public key is for example an SMS, MMS or a control SMS, etc.

In particular, the authenticator 23 comprises a comparator (not illustrated) for comparing the activation code act_cd transmitted during the transmission 5.auth_mssg and the activation code act_cd' received during the reception of the activation code 6.$ck_{pb}$_vd: act_cd'=act_cd?. If the two activation codes are identical, the terminal $1_U$ is authenticated and, where applicable, the received public key $ck_{pb}$ is stored by the authenticator in a memory or database 29, in particular implemented in the mediation server 2. If the two activation codes are not identical, the terminal $1_U$ is not authenticated and, where applicable, the received public key $ck_{pb}$ is not kept by the mediation server 2.

In particular, if the terminal $1_U$ is authenticated, the authenticator 23 controls a validator 24, which triggers the switching of the network key recoverer or of the network key recovery method to operational mode by transmitting a trigger message 7.ok to the terminal $1_U$.

In particular, the coupler 15 comprises a state changer 154 that switches the network key recoverer to operational mode. The state changer 1054 in particular provides an authorization command nk_rvy_ok to implement the recoverer or to execute the network key recovery method.

FIG. 8c corresponds to an architecture implementing the network key recovery, in particular as illustrated in at least one of the following figures: FIG. 1, FIG. 3, FIG. 4 and FIG. 6.

The architecture implementing the network key recovery comprises:
a communication terminal $1_U$ of a user U,
a mediation server 2, and
an access point 3.

The access point 3 comprises a transmitter 33 for transmitting a network key from the access point 3 to a mediation server 2.

The mediation server 2 comprises a transmitter 221 for transmitting the network key received from the access point 3 by the mediation server 2 to the terminal $1_U$ whose identifier T_id was associated, during the preliminary phase (cf. FIG. 8a), with the identifier of the access point 3 that provided the network key nk.

The terminal $1_U$ comprises a receiver 121 for receiving, from the mediation server 2 with which the terminal $1_U$ was associated during the initialization phase (cf. FIG. 8b), a network key of the access point PA whose identifier PA_id was associated with its identifier T_id during the preliminary phase (cf. FIG. 8a).

The terminal $1_U$ comprises a recovery interface or device 18 for recovering the network key of an access point 3 to a network implemented by a terminal $1_U$, the network key nk allowing the terminal $1_U$ to be associated with the access point 3 upon the first connection of the terminal $1_U$ to the access point 3. The recovery interface comprises a receiver 121 for receiving a network key sent by an access point 3 via a mediation server 2. The terminal $1_U$ has been identified by the mediation server 2 by way of an association, prior to the first connection, of an identifier of the terminal T_id and an identifier of the access point PA_id (cf. in particular FIG. 8a).

The mediation server 2 comprises a recovery manager 28 for managing the recovery of a network key of an access point to a network implemented by a mediation server 2, the network key nk allowing the terminal $1_U$ to be associated with the access point 3 upon the first connection of the terminal $1_U$ to the access point 3. The network key recovery manager comprises a transmitter 221 for transmitting a network key 7'.nk received from an access point 3 to a terminal $1_U$. The mediation server 2 has identified the terminal by way of an association, prior to the first connection, of an identifier of the terminal T_id and an identifier of the access point PA_id (cf. in particular FIG. 8a).

The access point 3 to a network comprises a network key provider 38, the network key nk allowing the terminal $1_U$ to be associated with the access point 3 upon the first connection of the terminal $1_U$ to the access point 3. The network key provider comprises a transmitter 33 for transmitting the network key nk of the access point 3 to a terminal $1_U$ via a mediation server 2. The terminal $1_U$ has been identified by the mediation server 2 by way of an association, prior to the first connection, of an identifier of the terminal T_id and an identifier of the access point PA_id (cf. in particular FIG. 8a).

In one particular embodiment illustrated in FIG. 8c, the terminal $1_U$, or even the recovery interface or device 18, comprises a reproducer or a reproduction interface 11 for reproducing a message, reproducing the message rq_mssg upon a reproduction command 1.rpr_cmd from a network key recoverer 16. The reproduction command 1.rpr_cmd is in particular generated when the recoverer 16 is started.

The reproduced message is intended directly or indirectly for the access point 3 whose identifier P_id was associated, during the preliminary phase (cf. FIG. 8a), with the identifier of the terminal $1_U$ reproducing the message. If the reproduced message is intended indirectly for the access point 3, it is in particular reproduced on a screen 110 and/or by loudspeakers 111 in order to be read, listened to, etc. by a user U of the terminal $1_U$. The message is in this case a request for action 2.cpt_rq, triggering an action 3.c by the user U in relation to the access point 3. If the reproduced message is intended directly for the access point 3, the message 3.c is reproduced by the terminal $1_U$, in particular by the reproduction interface 11.

The access point 3, or even the network key provider 38, comprises in particular a sensor 30 for sensing, respectively, the action by the user U in relation to the access point 3 or the message reproduced by the terminal $1_U$: 3. c. The sensor 30 directly or indirectly triggers 4.nk_sh_trg the transmitter 33 to transmit the network key to the mediation server 2.

In particular, the access point 3, or even the network key provider 38, comprises a requester 37 requesting the establishment of a connection of the access point 3 to the mediation server 2. The requester 37 is in particular triggered 4.nk_sh_trg by the sensor 30. The requester 37 sends in particular, to the mediation server 2, a request to establish a connection 5.stb_rq possibly comprising an identifier of the access point PA_id: 5.stb_rq(PA_id).

In particular, the mediation server 2, or even the network key recovery manager 28, comprises a connection establishment device 27 establishing a connection of the mediation server 2 to the access point 3 triggered by the connection establishment request 5.stb_rq from the access point 3. The connection establishment device in particular comprises means for establishing a connection to an access point 270 receiving the connection establishment request 5.stb_rq from the access point 3. The connection establishment device 27, or even the establishment means 270, triggers 6. PA_cnx_trg the establishment of a communication session between the mediation server and the access point PA/SM_SS.

The transmitter 33 thus transmits 7'.nk the network key to the mediation server 2 using this communication session between the mediation server and the access point PA/SM_SS.

In particular, the mediation server 2, or even the network key recovery manager 28, comprises a network key receiver 203, which receives the network key 7'.nk transmitted by the access point 3 via the communication session PA/SM_SS established between the access point 3 and the mediation server 2.

In particular, the network key receiver 203 provides the received network key 8.nk to the network key transmitter 221.

In particular, the terminal $1_U$, or even the network key recovery interface 18, comprises a transmitter 17 for transmitting a network key request. The network key request transmitter 17 is triggered 4'.cnx_cmd by the recoverer 16 or the reproducer 11 during the reproduction of the message rq_mssg. The network key request transmitter 17 sends in particular, to the mediation server 2, a network key request 5'.nk_rq possibly comprising an identifier of the terminal T_id: 5'.nk_rq(T_id).

This network key request transmitter 17 is implemented in particular in parallel with the implementation of the requester 37.

In particular, the establishment device comprises means 271 for establishing a connection of the mediation server to the terminal.

In particular, the establishment device 27 of the mediation server 2 is triggered by the network key request 5'.nk_rq from the terminal T. The establishment device 27, or even the establishment means 271, triggers 6'.T_cnx_trg the establishment of a communication session between the mediation server and the terminal T/SM_SS.

In particular, the mediation server 2, or even the network key recovery manager 28, implements the means for establishing a connection to the terminal 271 and the means for establishing a connection to the access point 270 in parallel.

In particular, the mediation server 2, or even the network key recovery manager 28, implements the means for establishing a connection to the terminal 271 and the means for establishing a connection to the access point 270 simultaneously.

In particular, in one embodiment in which the mediation server does not receive a network key request 5'.nk_rq from a terminal $1_U$, the mediation server 2, or even the network key recovery manager 28, comprises a search engine 25 that makes it possible to search for the identifier of the terminal T_id associated with the identifier of the access point that provided the network key 7'.nk. The search engine 25 then triggers the means for establishing a connection 271 to the terminal identified by the search $1_U$. In particular, the transmitter of the network key 221 is triggered directly or indirectly by the establishment device 270 during the establishment of a connection to the identified terminal $1_U$, or even the means for establishing the connection of the mediation server to the terminal 271.

In particular, the mediation server 2, or even the network key recovery manager 28, comprises a timer 26. The establishment device 270, during the establishment of a connection to the identified terminal $1_U$, or even the means for establishing the connection of the mediation server to the terminal 271, in particular triggers 8'.tm_trg the timer 26. The timer 26 is stopped 8".tm_stp by the receiver 203 upon the reception of a network key nk from the access point 3. If the transmitter of the network key 221 is triggered indirectly by the establishment device 27, 271, it is the timer 26 that triggers the transmitter of the network key 221.

In particular, the mediation server 2, or even the network key recovery manager 28, comprises a verifier 25 that makes it possible to verify whether the terminal $1_U$ requesting the network key is the terminal whose identifier has been associated beforehand with an identifier of the access point 3 whose network key is requested. The verifier 25 authorizes the transmitter of the network key 221 to transmit the received network key nk if the verification is positive.

The verifier 25 in particular comprises a search engine that makes it possible to search for the identifier of the terminal T_id associated with the identifier of the access point that provided the network key 7'.nk, recorded for example in a memory 223 of the mediation server 2 or 423 of another server 4 (cf. FIG. 8a). The verifier 25 possibly comprises a comparator (not illustrated) for comparing the terminal identifier obtained by the search engine with the identifier of the terminal $1_U$ requesting the network key.

The transmitter of the network key 221 in particular comprises an encryptor, also called encoder, 2212 and/or an integrator 2213 for integrating the network key into a message or data packet. The network key transmitter 221 thus transmits either the encrypted or unencrypted network key nk* or nk or an encrypted or unencrypted message comprising the encrypted or unencrypted network key mssg*(nk) or mssg(n*), mssg(nk), etc.: 11.nk, nk*, mssg(nk), mssg(nk*), mssg*(nk) via the communication session T/SM_SS established between the terminal T and the communication server to the terminal T. In particular, the transmitter of the network key 221 comprises a transmitter 2211 able to transmit data comprising a network key via the communication session T/SM_SS.

In particular, the encryptor performs the encryption using the public key $ck_{pb}$ stored during the initialization phase (cf. FIG. 8b) in a memory 29 of the mediation server.

In particular, the terminal $1_U$ comprises a network key collector 12 comprising the network key receiver 121. The network key collector 12 comprises, in particular, a decryptor, also called decoder, 122 and/or an extractor 123 for extracting the network key from a message or data packet comprising the network key and received from the mediation server 2. The decryptor 122 in particular performs the decryption using the private key $ck_{pv}$ stored during the initialization phase (cf. FIG. 8b).

The collector 12 in particular provides the received, possibly decrypted and/or extracted network key 13.nk to a coupler 19 that makes it possible to associate the terminal $1_U$ with the access point 3 upon a first connection.

The invention also targets a medium. The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from a network, in particular from the Internet.

As an alternative, the information medium may be an integrated circuit in which the program is incorporated, the circuit being designed to execute or to be used in the execution of the method in question.

In another implementation, the invention is implemented by way of software and/or hardware components. With this in mind, the term module may correspond equally to a software component or to a hardware component. A software component corresponds to one or more computer programs, one or more subroutines of a program or, more generally, to any element of a program or of software that is capable of implementing a function or a set of functions in accordance with the above description. A hardware component corresponds to any element of a hardware assembly that is capable of implementing a function or a set of functions.

Although the present disclosure has been described with reference to one or more examples, workers skilled in the art will recognize that changes may be made in form and detail without departing from the scope of the disclosure and/or the appended claims.

The invention claimed is:

1. A network key recovery method for recovering a network key of an access point to a network, the network key allowing the terminal to be associated with the access point upon a first connection of the terminal to the access point, the network key recovery method being implemented by a terminal and comprising:
receiving, by the terminal, the network key sent by the access point via a mediation server, after the terminal has been identified by the mediation server from a search by the mediation server for a terminal whose identifier is associated, prior to the first connection, to an identifier of the access point.

2. The network key recovery method as claimed in claim 1, wherein the network key recovery method comprises, prior to receiving the network key, transmitting a network key request by the terminal to the mediation server.

3. The network key recovery method as claimed in claim 1, wherein the transmitting of the network key request triggers at least one of the following:
triggering establishment of a communication session between the terminal and the mediation server, able to allow the network key to be transmitted from the mediation server to the terminal; or
verification, by the mediation server, that the terminal that transmitted the request corresponds to the terminal whose identifier is associated with an identifier of the access point.

4. The network key recovery method as claimed in claim 1, wherein the network key recovery method comprises decrypting the received network key.

5. The network key recovery method as claimed in claim 1, wherein the decrypting is performed by way of a private key generated by the terminal with a public key transmitted to the mediation server by the terminal upon an association, performed prior to the implementation of the network key recovery method, of the terminal with the mediation server, the network key having been encrypted by the mediation server by way of the public key.

6. A network key sending method for sending a network key of an access point to a network, the network key allowing a terminal to be associated with the access point upon a first connection of the terminal to the access point, the network key sending method being implemented by the access point and comprising:
transmitting the network key by the access point to the terminal via a mediation server, after the terminal has been identified by the mediation server from a search by the mediation server for a terminal whose identifier is associated, prior to the first connection, to an identifier of the access point.

7. The network key sending method as claimed in claim 6, wherein the transmitting of the network key comprises transmitting a message to the mediation server, the message comprising the network key and an identifier of the access point allowing the mediation server to determine the identifier of the terminal associated with the identifier of the access point prior to the first connection.

8. The network key sending method as claimed in claim 6, wherein the network key sending method comprises actuation of an actuable device of the access point, triggering the transmitting of the network key.

9. The network key sending method as claimed in claim 6, wherein the transmitting of the network key by the access point to the mediation server is performed securely.

10. A network key recovery management method for managing recovery of a network key of an access point to a network, the network key allowing a terminal to be associated with the access point upon a first connection of the terminal to the access point, the network key recovery management method being implemented by a mediation server and comprising:
    identifying the terminal by searching for a terminal whose identifier is associated, prior to the first connection, to an identifier of the access point; and
    transmitting, by the mediation server to the terminal, the network key received from the access point after the mediation server has identified the terminal.

11. The network key recovery management method as claimed in claim 10, wherein the network key recovery management method comprises encrypting the network key prior to the transmitting.

12. A terminal comprising:
    a recovery interface for recovering a network key of an access point to a network, the network key allowing the terminal to be associated with the access point upon a first connection of the terminal to the access point, the recovery interface comprising:
        a receiver configured to receive the network key sent by the access point via a mediation server, after the terminal has been identified by the mediation server from a search by the mediation server for a terminal whose identifier is associated, prior to the first connection, to an identifier of the access point.

13. A mediation server comprising:
    a recovery manager for managing the recovery of a network key of an access point to a network, the network key allowing a terminal to be associated with the access point upon a first connection of the terminal to the access point, the network key recovery manager comprising:
        a processor configured to identify the terminal by searching for a terminal whose identifier is associated, prior to the first connection, to an identifier of the access point; and
        a transmitter configured to transmit, to the terminal, the network key received from the access point after the mediation server has identified the terminal.

14. An access point to a network comprising a network key provider, the network key allowing a terminal to be associated with the access point upon a first connection of the terminal to the access point, the network key provider comprising:
    a transmitter configured to transmit the network key of the access point to the terminal via a mediation server, after the terminal has been identified by the mediation server from a search by the mediation server for a terminal whose identifier is associated, prior to the first connection, to an identifier of the access point.

* * * * *